US010737609B2

(12) United States Patent
Stanesic

(10) Patent No.: US 10,737,609 B2
(45) Date of Patent: Aug. 11, 2020

(54) CARGO RESTRAINING SYSTEM FOR VEHICLES

(71) Applicant: Corinthian Textile Solutions, Inc., Portland, OR (US)

(72) Inventor: John M. Stanesic, Dacula, GA (US)

(73) Assignee: Corinthian Textile Solutions, Inc., Portland, OR (US)

( * ) Notice: Subject to any disclaimer, the term of this patent is extended or adjusted under 35 U.S.C. 154(b) by 0 days.

(21) Appl. No.: 16/255,419

(22) Filed: Jan. 23, 2019

(65) Prior Publication Data

US 2019/0232859 A1 Aug. 1, 2019

Related U.S. Application Data

(60) Provisional application No. 62/623,959, filed on Jan. 30, 2018.

(51) Int. Cl.
*B60P 7/14* (2006.01)
*B60P 7/08* (2006.01)

(52) U.S. Cl.
CPC .............. *B60P 7/14* (2013.01); *B60P 7/0892* (2013.01)

(58) Field of Classification Search
CPC ............. B60P 7/14; B60P 7/0892; B60R 7/04
USPC ......... 410/121, 153, 155; 211/71.01, 72, 73, 211/195, 42; 224/901, 901.2, 901.6, 224/901.8, 311, 314, 317–320, 325, 326; 248/500, 503, 205.1, 205.2, 201, 174, 248/680, 357
See application file for complete search history.

(56) References Cited

U.S. PATENT DOCUMENTS

| 337,544 | A | * | 3/1886 | Yaggy | A47B 23/042 248/460 |
|---|---|---|---|---|---|
| 2,459,928 | A | * | 1/1949 | Edwards | G09F 1/14 40/610 |
| 2,654,516 | A | * | 10/1953 | Edwards | B60R 9/055 224/314 |
| 4,189,056 | A | | 2/1980 | Majewski | |
| 4,678,018 | A | * | 7/1987 | Grundstedt | A47F 11/02 160/135 |
| 4,838,745 | A | | 6/1989 | Haydock | |
| 5,078,284 | A | * | 1/1992 | Pirkl | A47F 5/105 211/195 |
| 5,129,612 | A | | 7/1992 | Beaupre | |
| 5,161,700 | A | | 11/1992 | Stannis et al. | |
| 5,215,205 | A | | 6/1993 | Behlman | |

(Continued)

*Primary Examiner* — Hilary L Gutman
(74) *Attorney, Agent, or Firm* — Womble Bond Dickinson (US) LLP

(57) ABSTRACT

A cargo restraining system for use in a trunk or cargo area of a vehicle includes at least one restraining unit. The restraining unit comprises a bottom panel, a face panel, and a back panel. The bottom panel and the face panel are hingedly attached together along adjacent edges. The back panel is hingedly attached to face panel along the edge opposite that to which the bottom panel is hingedly attached. The restraining unit can be erected from a flat configuration wherein the three panels are substantially coplanar with each other to an upstanding operational or functional configuration. In the upstanding configuration, the bottom panel sits on a surface, the face panel is pivoted upwardly to extend vertically from the surface, and the back panel is hinged downwardly at an angle and its free edge is attached to the free edge of the bottom panel.

14 Claims, 8 Drawing Sheets

(56) References Cited

U.S. PATENT DOCUMENTS

| | | | |
|---|---|---|---|
| 5,464,102 A | 11/1995 | LeBlanc et al. | |
| 5,601,271 A | 2/1997 | Janowski et al. | |
| 5,662,305 A | 9/1997 | Shimamura et al. | |
| 5,865,580 A | 2/1999 | Lawrence | |
| 5,997,228 A | 12/1999 | Potter | |
| 6,012,885 A | 1/2000 | Taylor et al. | |
| 6,109,847 A | 8/2000 | Patel et al. | |
| 6,234,733 B1 * | 5/2001 | Parr | B60R 7/02 410/118 |
| 6,244,802 B1 | 6/2001 | Stanesic et al. | |
| D534,730 S * | 1/2007 | Hardy | D6/312 |
| 7,178,778 B2 * | 2/2007 | Lee | A47B 97/08 248/174 |
| 7,334,768 B1 * | 2/2008 | Lum | A47B 23/04 248/444 |
| 7,438,845 B2 | 10/2008 | McVicker | |
| 8,256,985 B2 * | 9/2012 | Ashmead | E01F 13/02 404/6 |
| 8,430,714 B2 * | 4/2013 | Benincasa | A01K 47/00 449/3 |
| 9,067,521 B1 * | 6/2015 | Masanek, Jr. | B60R 11/00 |
| 2009/0236870 A1 * | 9/2009 | Duncan | B60J 7/141 296/136.04 |
| 2019/0381929 A1 * | 12/2019 | Millett | B60R 7/02 |

* cited by examiner

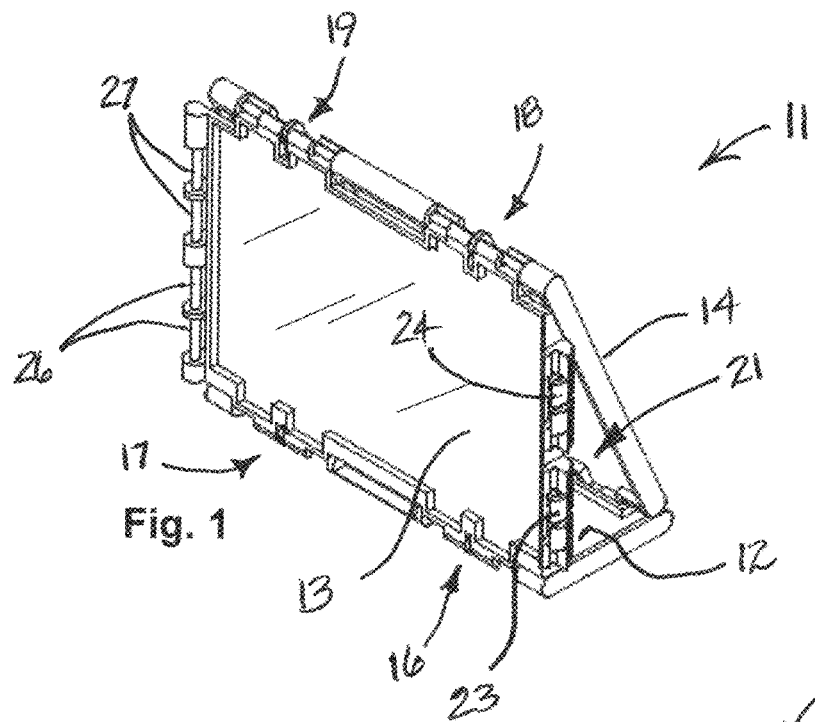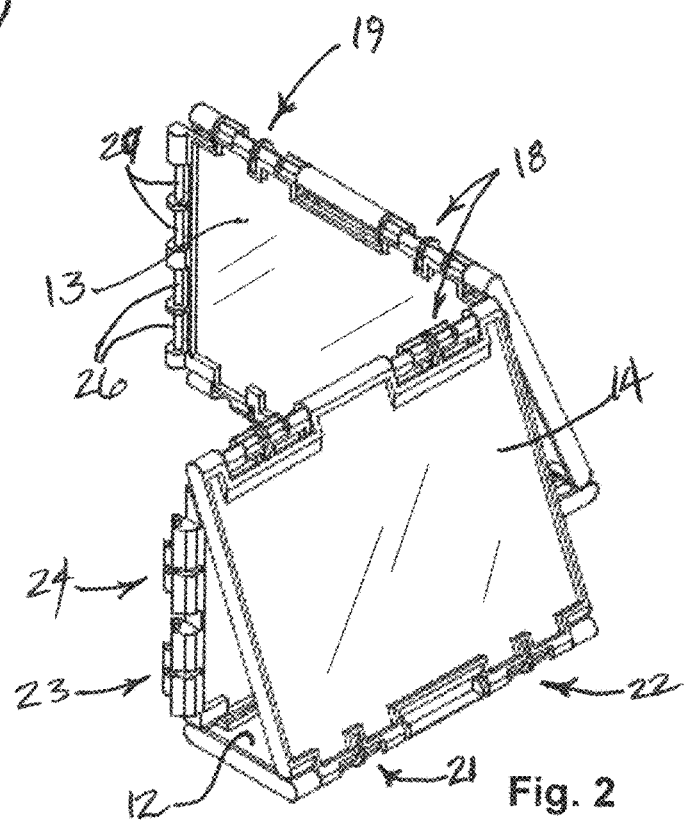

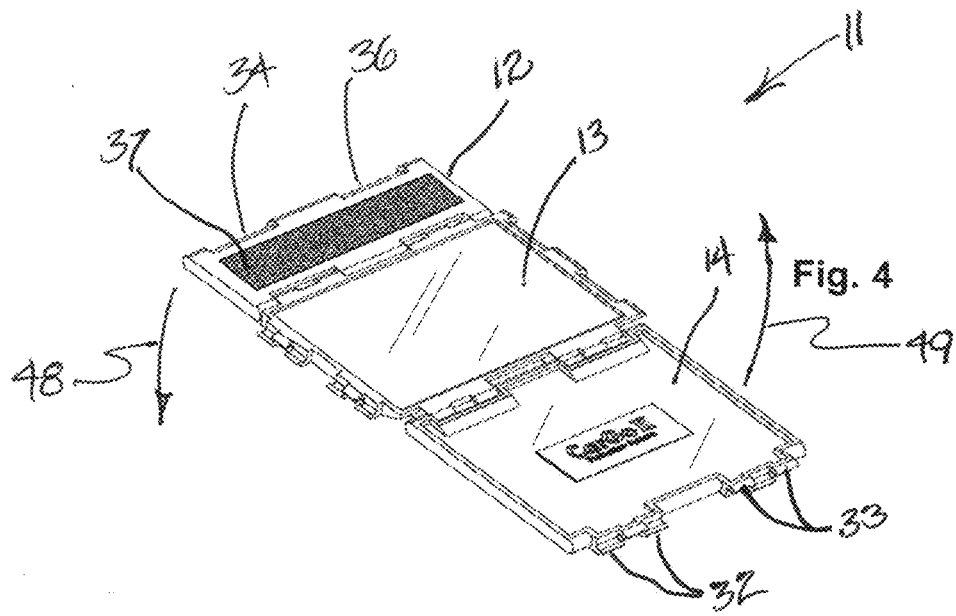
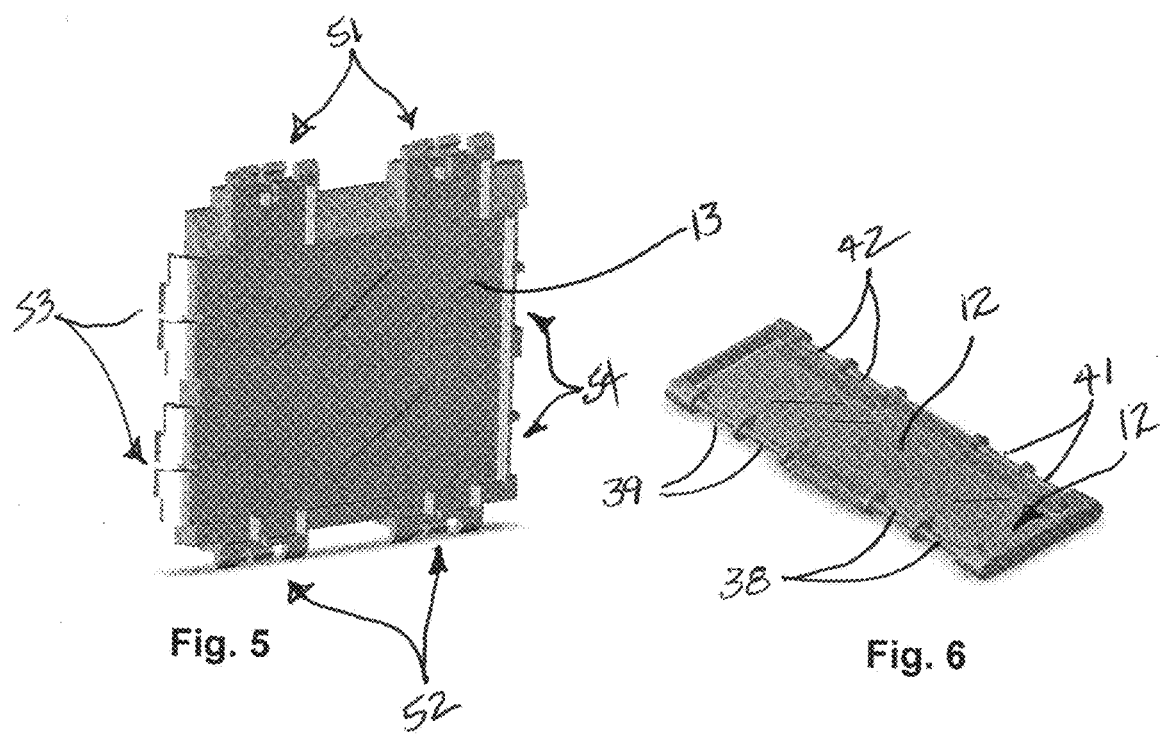
Fig. 4
Fig. 5
Fig. 6

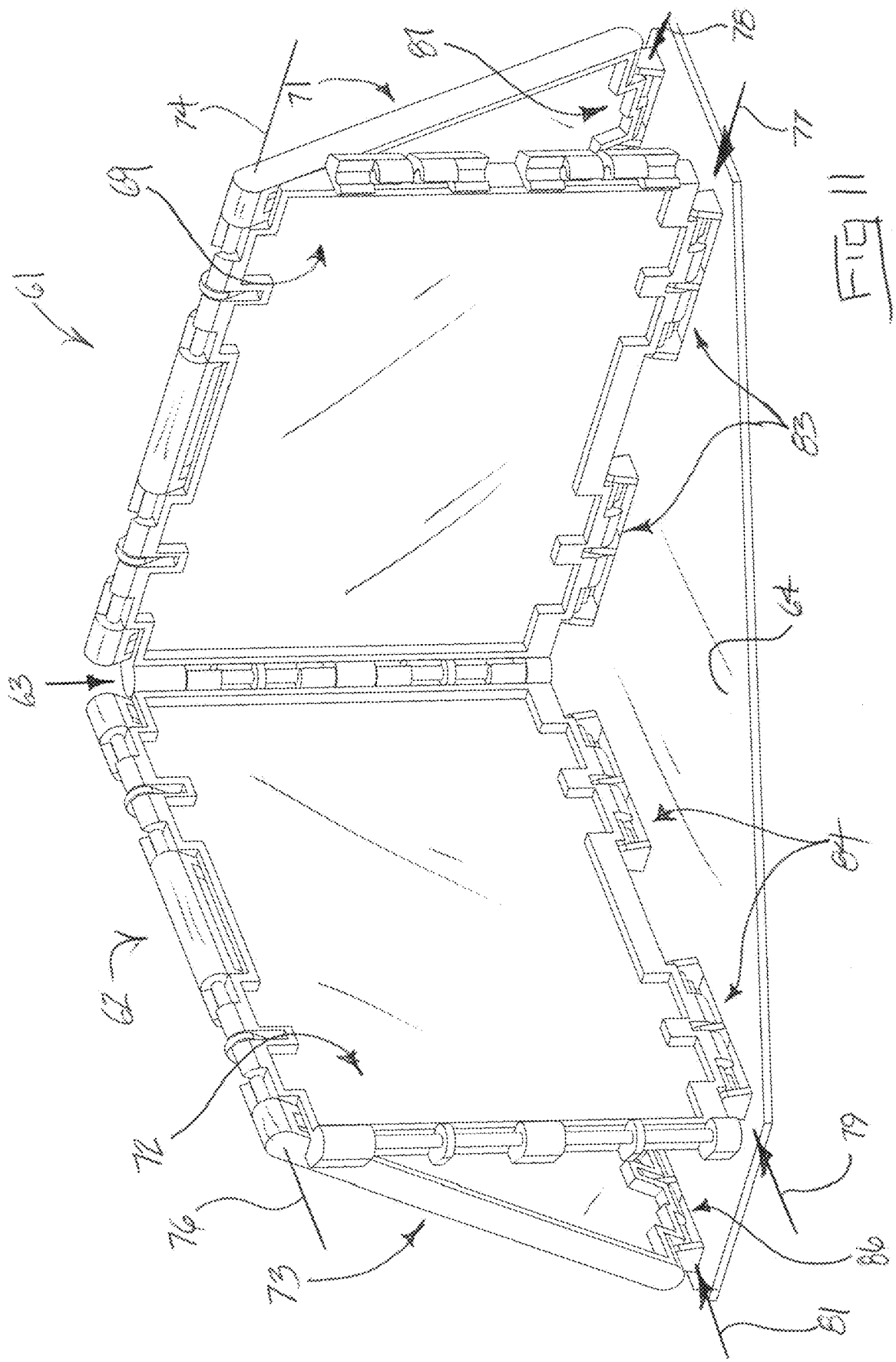

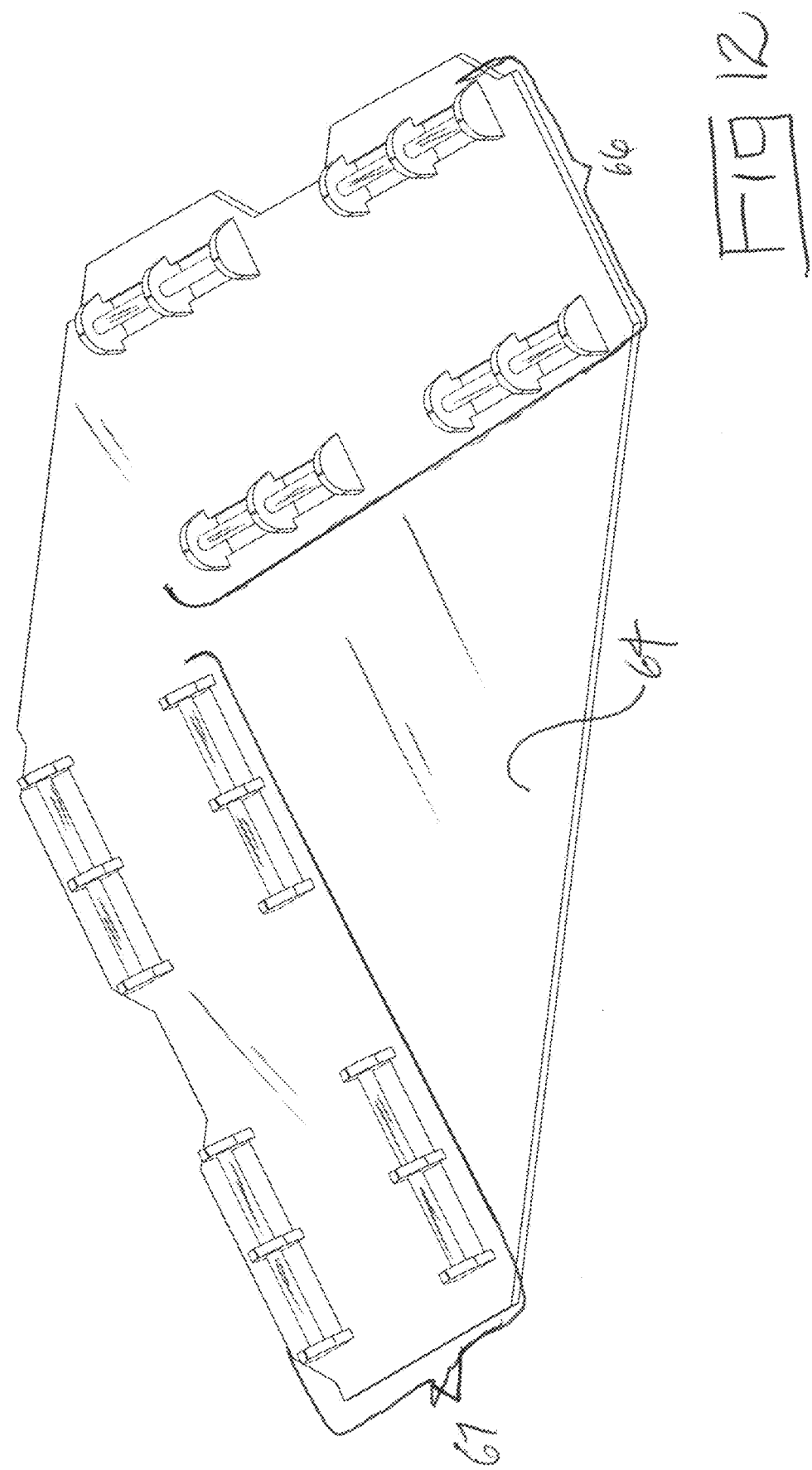

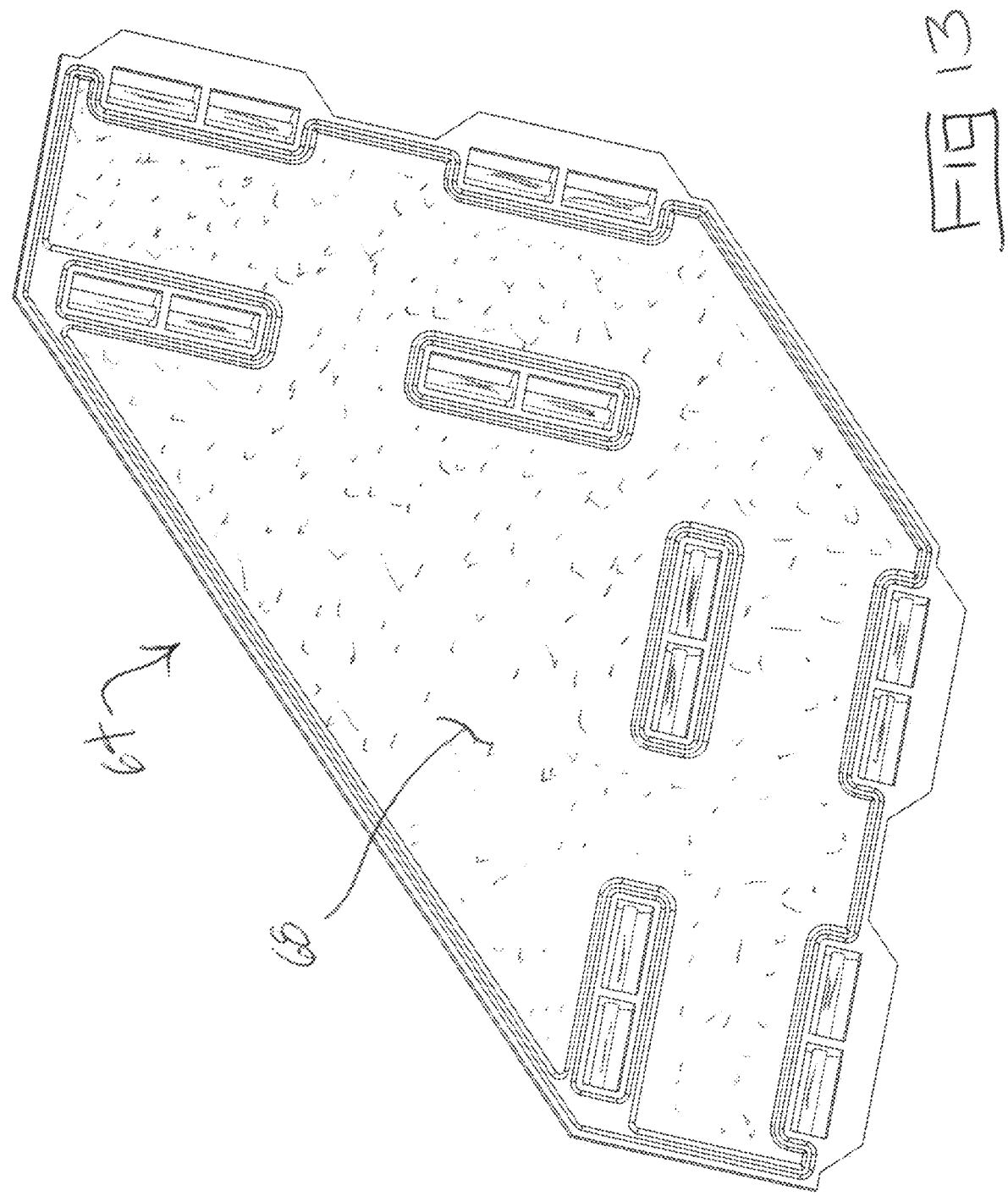

CARGO RESTRAINING SYSTEM FOR VEHICLES

REFERENCE TO RELATED APPLICATION

Priority is hereby claimed to the filing date of U.S. provisional patent application 62/623,959 entitled Cargo Restraining System for Vehicles filed on Jan. 30, 2018, the contents of which are hereby incorporated by reference.

TECHNICAL FIELD

The invention exemplified by this disclosure relates generally to vehicle accessories and more specifically to devices and methods for restraining items in a trunk or cargo area of a vehicle against shifting and tipping during transport.

BACKGROUND

Personal use motor vehicles such as automobiles, station wagons, hatchbacks, sports utility vehicles, vans, and pick-up trucks are used on an almost daily basis to transport people and to transport articles for household and other uses. Consumer articles such as groceries are typically bagged and placed inside the vehicle on a seat, floor area, trunk area, or cargo area. Consumer articles such as potted plants are more likely to be put into a trunk area or a back cargo area of the vehicle. Small reusable articles for occasional use such as fishing tackle, sports equipment, and the like will likely be placed in the vehicle where they can be out of sight but conveniently retrieved, for example; the trunk or cargo area.

Anyone who has ever driven a motor vehicle knows that articles to be transported can pose a problem. Cargo such as filled grocery bags in particular represents a widely experienced problem. They tend to fall over and spill their contents when the vehicle turns a corner even at slow speeds and certainly upon sudden stops. The problem can be lessened in automobiles that have deep back seat floor wells by placing items there. However, vehicles with a flat floor area, flat trunk area, or a flat back cargo area present a real challenge when it comes to restraining such cargo during transport.

Many individuals will carefully pack articles up against a back seat and door or place objects such as blankets around the articles to keep them from sliding around or tipping over during transport. This can work depending on the care and effort expended by the individual. Others have purchased various racks and organizers sold for this purpose. U.S. Pat. Nos. 4,718,584, 4,842,460 and 5,031,7669 illustrate examples of such organizers. Racks and organizers appear to serve their purpose. However, it is also apparent that such products take up valuable space when not in use. They also tend not to be versatile in the types of articles they can hold effectively, nor are they easily adaptable or configurable to accommodate objects of various shapes and sizes.

Prior art U.S. Pat. No. 6,244,802 of Stanesic discloses cargo hold retention system for use in trunks and cargo areas of motor vehicles. The system comprises a carpeted floor mat with at least some looped fibers configured to fit in a defined area of the vehicle, e.g. a trunk or back cargo area. The system also includes at least one rigid retention member having at least two linear upstanding walls connected at a substantially right angle. Hook-type fasteners are adhered to the bottom surfaces of the retention member.

In use, the hook-type fasteners on the rigid retention member of Stanesic interact with the looped fibers of the floor mat to secure the retention member firmly to the floor mat wherever it is placed. One or more of the rigid retention members can be secured to the carpet abutting cargo such as grocery bags or boxes to prevent the cargo from moving around or tipping over during transport. While this system is a step in the right direction, the rigid retention members nevertheless are bulky and thus expensive to pack and ship. They also take up a lot of room when not being used. Further, their fixed configuration means that the rigid retention members are not easily adaptable to accommodate cargo of odd shapes or cargo that forms an irregular footprint.

A need exists for a system and method of restraining cargo in a cargo area or trunk of a vehicle such that the cargo does not slide around or tip over as it is transported. Such a system and method should have a compact configuration for packing, shipping, and storage and should be erectable into an operational configuration when needed. The system should be easily configurable to accommodate oddly shaped cargo and cargo that forms an unusual footprint. The system also should be adaptable to carpeted surfaces as well as non-carpeted or smooth surfaces. It is to a cargo restraining system and method that successfully addresses these and other needs that the present invention is primarily directed.

SUMMARY

Briefly described, a cargo restraining system comprises one and preferably a plurality of erectable and collapsible restraining units. In one embodiment, each restraining unit, when erected to its operational configuration, includes a base panel having opposed edges. A face panel has opposed edges and is hingedly attached along one of its edges to an edge of the base panel. A back panel has opposed edges and is hingedly attached along one of its edges to the opposite edge of the base panel. The opposed edges of the face and back panels that are not attached to the base panel are hingedly attached to each other. The panels are sized such that when a restraining unit is erected, it forms a right triangular wedge when sitting on its bottom panel. More specifically, the face panel extends vertically from one edge of the bottom panel. The back panel extends upwardly at an angle from the other side of the base panel to the upper edge of the face panel to which it is hingedly attached.

In one embodiment, the underside of the base panel is provided with hook-type fasteners configured to grip looped fibers of a carpeted surface when the base is placed on the carpet. Most trunk areas and cargo areas of cars and trucks are covered in carpet that has looped fibers. When it is desired to restrain cargo in these areas, one or more of the erected wedge-shaped restraining units of this system are placed on the carpeted surface abutting the cargo to be restrained. The hook-type fasteners on the underside of the base panels securely grip the carpet so that the restraining units stay put to prevent the cargo from sliding around or tipping over in transit. When it is desired to remove the cargo at its destination, the restraining units are simply pulled away from the carpet with sufficient force to disengage the hook-type fasteners from the carpet.

In a slightly different embodiment, the base panel is larger and is provided on its bottom side with a rubberized anti-slip surface. This embodiment can be used with carpeted surfaces and with non-carpeted and smooth surfaces such as, for example, a metal surface, the surface of a rubber mat, a vinyl or leather surface, or the bed of a truck to restrain cargo during transport.

Multiple restraining units can be attached end-to-end with built-in hinges to form a chain of restraining units. Since the angles are adjustable, the chain can be configured to follow the footprint of virtually any cargo and stuck to the carpet of a trunk or cargo area to restrain the cargo. For shipping and storage, restraining units can be collapsed to a flat configuration by disengaging one set of hinges that attach the panels together and unfolding the panels until they are flat. When two restraining units are attached end-to-end, each can be unfolded and then one can be folded over onto the other to form a double-thick but flat configuration. Thus, the restraining units require only a fraction of the space in a package or in a storage area than prior art molded restrainers.

Accordingly, a cargo restraining system is disclosed that successfully addresses the problems and shortcomings of prior art cargo restraints and offers additional unique and beneficial features beyond what can be offered by the prior art. These and other features, aspects, and benefits of the system will be understood better upon review of the detailed description set forth below taken in conjunction with the accompanying drawing figures, which are briefly described as follows.

BRIEF DESCRIPTION OF THE DRAWINGS

FIG. 1 is a perspective view of an erected restraining unit of the cargo restraining system that exemplifies principles of the invention on one preferred embodiment.

FIG. 2 is a perspective view showing two erected restraining units hingedly attached together at their ends.

FIG. 4 is a perspective view of a restraining unit in its collapsed flat configuration for packaging, shipping, and storage.

FIG. 5 is a perspective view of the face panel of a restraining unit disconnected from other panels of the unit.

FIG. 6 is a perspective view of the base panel of a restraining unit disconnected from other panels of the unit.

FIG. 11 is a perspective view of another embodiment of the present invention for use on carpeted or smooth or non-carpeted surfaces.

FIG. 12 is a perspective view of the base of the embodiment of FIG. 11 showing hinge attachment locations for attaching face panels and back panels.

FIG. 13 is a perspective view of the bottom of the base of FIG. 12 showing a non-slip coating thereon.

DETAILED DESCRIPTION

Figure 3:
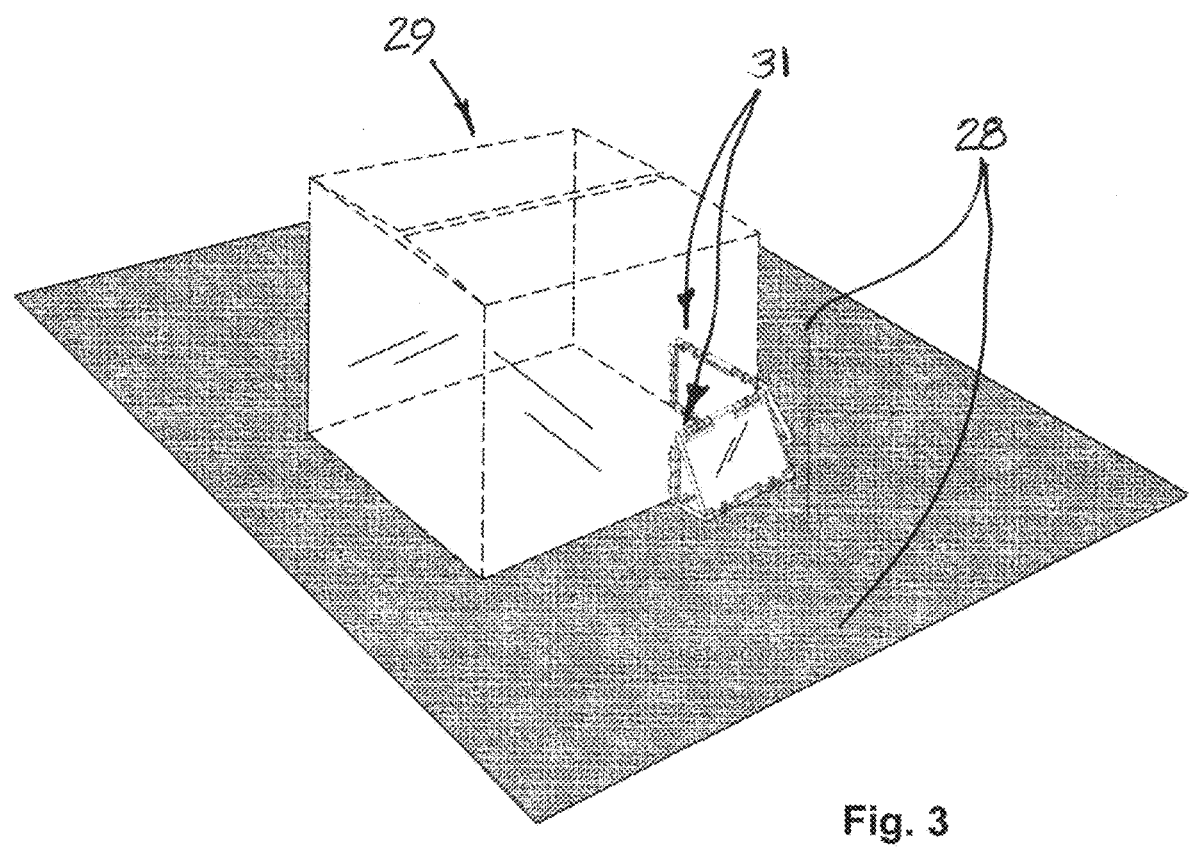
FIG. 3 is a perspective view showing two erected restraining units hingedly attached at their ends, adhered to a carpeted surface, and restraining cargo in the form of a box.

Reference will now be made in more detail to the drawing figures, wherein like reference numerals indicate like parts throughout the several views. FIG. 1 shows a single restraining unit of the system in its erected operational configuration for restraining cargo. The restraining unit 11 includes a base panel 12, a face panel 13, and a back panel 14, all of which are substantially rectangular in this exemplary embodiment. The face panel 13 is hingedly connected along its bottom edge to the front edge of the base panel 12 by means of snap hinges 16 and 17. The back panel 14 is hingedly connected along its bottom edge to the back edge of the base panel 12 by means of snap hinges 21 and 22 (FIG. 2). The top edges of the face panel and the back panel are hingedly connected together by means of snap hinges 18 and 19. This forms a right triangular restraining member with a face panel that extends vertically upwardly from the base panel and a back panel that extends at an angle from the top edge of the face panel to the back edge of the base panel.

Snap hinge barrels 23 and 24 are formed on one end of the face panel 13 and snap hinge pins 26 and 27 are formed on the other end of the face panel 13. These features allow two or more restraining units to be hingedly connected together at the ends of their face panels 13 to form a chain of restraining units, as detailed below. Snap hinges are known in the art. To form a hinged connection between panels, snap hinge barrels of one panel are urged with some force against the snap hinge pins of another panel. The snap hinge barrels expand slightly under the force to snap around corresponding snap hinge pins such that the panels become hingedly connected together. The panels can then be pivoted around the hinged connection to position the panels at a desired angle with respect to each other.

While snap hinges are illustrated in the preferred exemplary embodiments, it will be understood that other mechanisms of attaching panels together with a hinged connection may be substituted with equivalent results. Examples include hook-and-loop fasteners, live hinges, strips of fabric or other flexible material, traditional hinge pins slid through hinge barrels, and rubber flaps just to name a few. For purposes of this disclosure, the term "snap hinge" is intended to mean and include any type of fastening mechanism by which panels of restraining units can be connected together along their edges so that the panels can be hinged relative to one another.

FIG. 2 illustrates two restraining units of the invention with their face panels hingedly connected together at corresponding ends. To connect them, the snap hinge barrels at an end of one of the face panels are snapped onto the snap hinge pins on the opposite end of the other face panel as described above. In this figure, the two attached restraining units are pivoted relative to one another so that their face panels extend at a right angle. In such a configuration, the connected restraining units might be used, for example, to restrain a bottom corner of a box or other angularly shaped cargo.

Restraining such an angular object is illustrated in FIG. 3, which shows cargo in the form of a box 29 sitting on a carpeted surface 28 of a vehicle trunk or cargo area. Two restraining units 31 are configured with their face plates forming a right angle and the units are positioned on the carpeted surface abutting a bottom corner of the box. The underside of the bottom panels of the restraining units are provided in this particular example with hook-type fasteners 37 (FIG. 4) so that the restraining units stick firmly but removably by hook-and-loop adhesion to the carpeted surface. Of course, additional restraining units may be placed at other corners of the box or against sides of the box if desired. In such a scenario, the restraining units prevent the box from sliding or tipping over during transport and thereby constitute an embodiment of the cargo retaining system of the invention.

FIG. 4 shows a restraining unit 11 of the illustrated embodiment collapsed to its flat shipping and storage configuration with the front surface of the face panel facing downwardly. To collapse the restraining unit, the snap hinge connections 32, 33, 36, and 37 along the bottom edge of the back panel 13 and the back edge of the base panel 12 are pulled apart and separated. The panels of the restraining unit can then be pivoted along the remaining hinged connections until the panels are substantially co-planar to form the flat shipment and storage configuration shown in FIG. 4.

In the illustrated embodiment, a field of hook-type fasteners 37 is visible in FIG. 4 on the underside of the base panel 12. These hook-type fasteners may be formed on a strip of material adhered to the underside of the base panel. Preferably, however, they are integrally formed with the base panel itself through a process such as that disclosed in U.S. Pat. No. 7,438,845 of McVicker, the entire contents of which is hereby incorporated by reference. When an erected restraining unit is placed on a carpeted surface with at least some looped fibers, such as the carpeted floor of a trunk or cargo area, a familiar hook-and-loop adhesion is formed. The adhesion holds the restraining unit firmly but removably in place on the carpeted surface. In this way one or multiple restraining units can be positioned on the surface as needed to restrain cargo thereon against sliding and tipping over during transport.

While hook-and-loop adhesion is preferred for removably securing restraining units to a carpeted surface, it will be understood that the invention is not limited to hook-and-loop adhesion or to use on carpeted surfaces only. Other mechanisms for removably securing restraining units in place may be substituted within the scope of the invention. For example, fabrics with small mushroom-shaped fibers are available that function much like hook-and-loop fasteners to adhere objects releasably together. Many singed synthetic fabrics exhibit this feature. Mechanical fasteners are also available that couple together by mechanical interference such as in the familiar Lego® building blocks.

For use of the cargo restraint system on metal surfaces, the hook-type fasteners on the bottom of the base panel in the exemplary embodiment might be replaced with magnets. Or, as illustrated in the embodiment of FIGS. 11-13 and discussed in detail below, a rubberized or other non-slip surface coating might be applied to the bottom of a base for use on smooth or non-carpeted surfaces as well as carpeted surfaces. Thus, the discussion of "hook-and-loop" fasteners in the first exemplary embodiment should be understood to encompass these alternatives and any other system by which one object may be secured to another object in such a way that it resists sliding but can be removed when desired.

Figure 7:
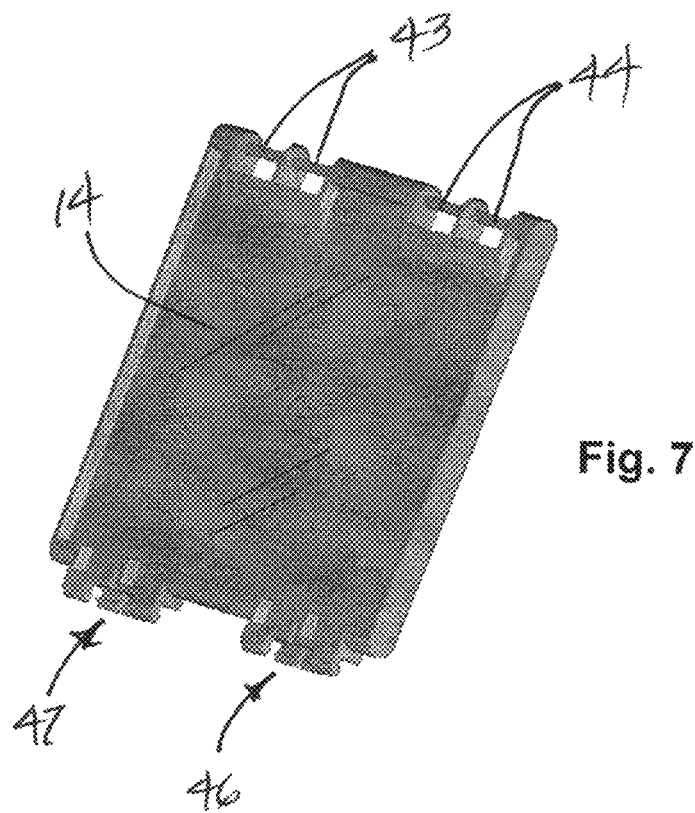
FIG. 7 is a perspective view of the back panel of a restraining unit disconnected from other panels of the unit.

FIGS. 5-7 show the individual panels of a restraining unit disconnected from each other. The face panel 13 (FIG. 5) is generally rectangular and is formed with snap hinge barrels 51 along its top edge and snap hinge barrels 52 along its bottom edge. Snap hinge barrels 53 are formed along the left end of the face panel and snap hinge pins 54 are formed along the right end. With barrels along the left end and pins along the right end, a plurality of face panels can be hingedly connected end-to-end to form a chain. The base panel 12 (FIG. 6) is generally rectangular in this embodiment and is formed with snap hinge pins 38 and 39 along its front edge and snap hinge pins 41 and 42 along its back edge. The snap hinge barrels 52 of the face panel snap onto the snap hinge pins 38 and 39 of the base panel to connect the two panels hingedly together.

The back panel 14 (FIG. 7) is generally rectangular in shape and is formed with snap hinge pins 43 and 44 along its top edge and snap hinge barrels 46 and 47 along its bottom edge. The snap hinge barrels 46 and 47 can be snapped onto the snap hinge pins 41 and 42 along the back edge of the base panel 12 (FIG. 6) to connect these two panels hingedly together. The snap hinge barrels 51 of the face panel 13 (FIG. 5) snap onto the snap hinge pins 43 and 44 along the top edge of the back panel 14 to attach these panels hingedly together. When all of the snap hinge components are snapped together, the restraining unit is erected and in its operation configuration as shown in FIG. 1.

Figure 8:
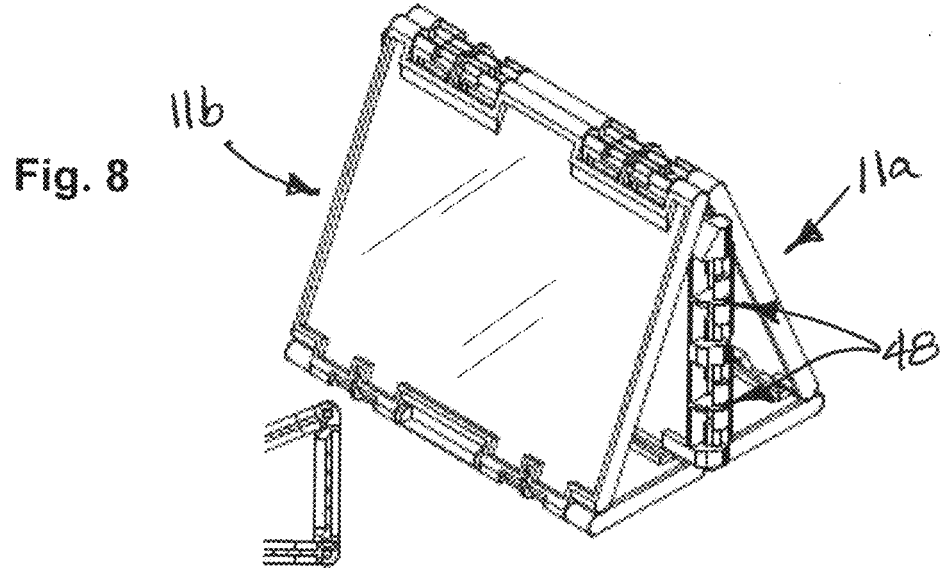
FIG. 8 is a perspective view of two restraining units hingedly connected at their ends with one unit pivoted 180 degrees to form a triangular cargo restraint.

As mentioned, two or more restraining units can be hingedly connected together at the ends of their face panels to form a chain or chains of restraining units. The illustrative drawings show only two restraining units connected in this way, but it will be understood that additional units can be chained together to form a restraining system of a desired length. When two restraining units are hingedly connected, they can be pivoted along their hinged connection to form a desired configuration. FIG. 8, for example, shows two restraining units 11a and 11b hingedly connected together. Restraining unit 11a is pivoted 180 degrees with respect to restraining unit 11b so that their face plates are juxtaposed against one another. This forms a triangular restraining system that might, for example, be used as a chock to prevent rounded objects from moving during transport.

Figure 9:
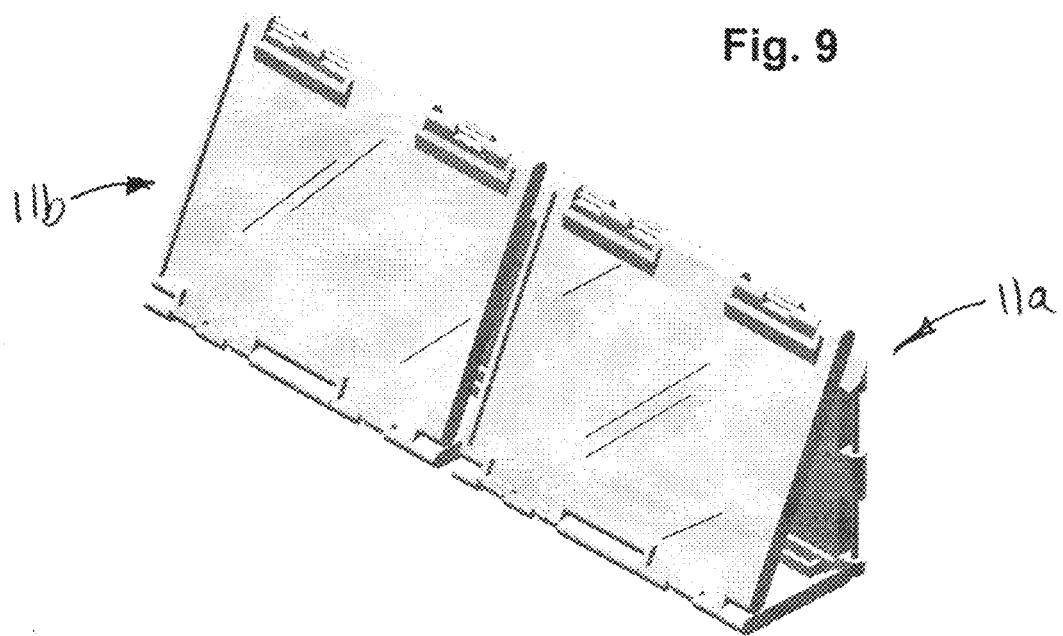
FIG. 9 is a perspective view of two restraining units hingedly connected at their ends and arranged in a co-linear orientation to form a long cargo restraint.
Figure 10:
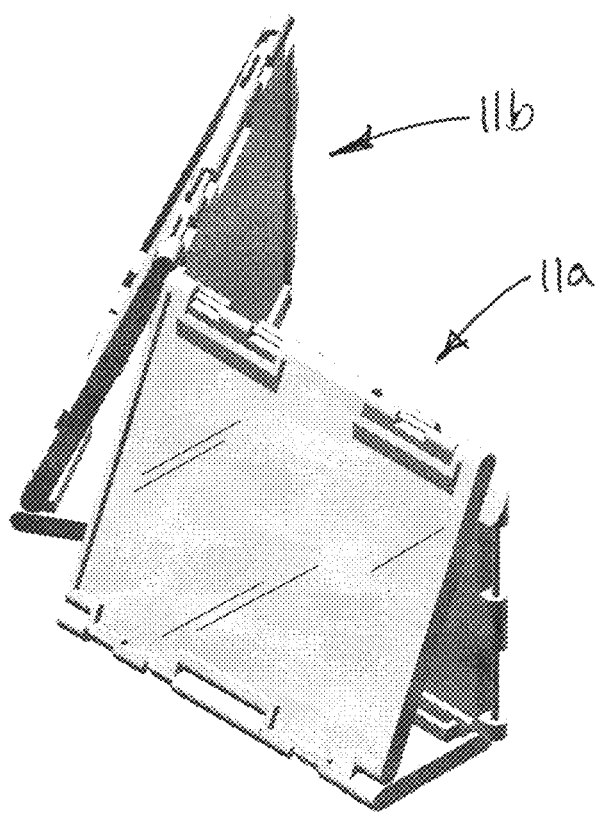
FIG. 10 is a perspective view of two restraining units hingedly connected at their ends and pivoted to form an angled cargo restraint.

FIG. 9 shows two restraining units 11a and 11b hingedly connected together with restraining unit 11a pivoted zero (0) degrees with respect to restraining unit 11b. This forms a restraining system that is straight and twice as long as a single restraining unit. This configuration may be useful, for example, to restrain cargo that is long and narrow. Finally, FIG. 10 shows the units 11a and 11b hingedly connected together and pivoted to an arbitrary acute angle between zero (0) degrees and 180 degrees. From these three examples, it will be appreciated that a plurality of restraining units can be chained together end-to-end and that the resulting chain can be formed into virtually any shape from straight to arcuate to serpentine as needed to surround cargo and prevent it from sliding and tipping during transport.

FIGS. 11-13 illustrate an alternate embodiment of the present invention for use on smooth or non-carpeted surfaces as well as on carpeted surfaces. Such surfaces might include, for instance, a metal surface, the top surface of a rubber floor mat; the vinyl or leather surface of a seat or the metal bed of a truck. Many of the details such as the hinge barrels and hinge pins are the same as those of the prior embodiment, and those details will not be described again in detail. FIG. 11 shows a cargo restraining unit made up of a first restraining unit 61 and a second restraining unit 62. The first restraining unit 61 comprises a vertical face panel 69 and an angled back panel 71. Likewise, the second restraining unit 62 comprises a vertical face panel 69 and an angled back panel 73. The face panels 61 and 62 are hingedly connected together along hinge line 63 with snap hinges as described above. Face panel 69 is hingedly connected to back panel 71 along hinge line 74 and face panel 72 is hingedly connected to back panel 73 along hinge line 76.

Unlike the prior embodiment, the restraining units 61 and 62 in this embodiment are attached to a base 64. As shown in FIG. 12, base 64 is provided with a first group of snap hinge pins 66 and a second group of snap hinge pins 67. Restraining unit 61 is attached to base 64 by snapping its snap hinge barrels onto the hinge pins of the first group 66 of the base as shown at 83 and 87. Restraining unit 62 is attached to base 64 by snapping its snap hinge barrels onto the hinge pins of the second group 67 as shown at 84 and 86. In the illustrated embodiment, the snap hinge pins of group 66 are arranged at a right angle to the snap hinge pins of group 67. So, for this example, the restraining units 61 and 62 are arranged at right angles to each other. However, this is not a limitation of the invention and bases with variously angled snap hinge pins may be used and are within the scope of the invention.

As shown in FIG. 13, the bottom side of the base 64 is provided with an exposed surface made of a non-slip material 68. The material 68 may be any appropriate material such as a rubber sheet, a polymer sheet, a rubberized foam, a jell, or any other material that resists slipping on a surface. When placed on a surface, the non-slip material 68 resists sliding on the surface by creating sliding friction between the material 68 and the surface. Further, since the base spans the space between the front faces of two restraining units, most cargo restrained by the system rests on the base 64. This imparts weight to the base 64, further enhancing its non-slip properties. So, this embodiment of the invention may be used, for example, at the bottom corners of a box of cargo in the bed of a pickup truck, a rubber floor mat, or a leather seat to restrain the box and prevent it from sliding around during transport.

The invention has been described herein in the context of the example embodiments shown in the drawing figures and described above. However, these are only examples of how the broader invention may be carried out. The skilled artisan will recognize that a wide gamut of additions, deletions, and modifications, both subtle and gross, might be made to the illustrated examples without departing from the spirit and scope of the invention. For example, while the example panels of the illustrated embodiments are made of molded plastic, this is not a limitation of the invention as they can be made of any sufficiently rigid material such as paperboard, leather, and carbon composite. Furthermore, the snap hinge connection system of the example embodiments may be replaced with any connection system that allows the panels to be erected and collapsed as described above. Live hinges, traditional hinges with removable hinge pins, hook-and-loop strips, and rubber fins are some examples.

What is claimed is:

1. A cargo restraining system for vehicles comprising:
   a first panel having top, bottom, and side edges;
   a second panel having top, bottom, and side edges;
   a base panel having a front edge and a back edge opposite the front edge;
   the first panel being attached along its bottom edge to the front edge of the base panel with a first hingeable attachment and extending upwardly at a first angle from the base panel to the top edge of the first panel;
   the second panel being attached along its bottom edge to the back edge of the base panel with a second hingeable attachment and extending upwardly from the base panel at a second angle to the top edge of the second panel;
   the top edges of the first and second panels being attached together with a third hingeable attachment;
   at least one of the first, second, and third hingeable attachments having an attached configuration forming a hinge and attaching adjacent edges of two panels together and being selectively separable into a detached configuration wherein the hingeable attachment is separated apart such that, the cargo restraining system can be folded to a substantially flat configuration for shipping and storage.

2. A cargo restraining system for vehicles as claimed in claim 1 wherein the first angle is a right angle.

3. A cargo restraining system for vehicles as claimed in claim 2 wherein the second angle is an acute angle.

4. A cargo restraining system for vehicles as claimed in claim 1 wherein the first panel and the second panel are generally rectangular in shape.

5. A cargo restraining system for vehicles as claimed in claim 4 wherein the base panel is generally rectangular in shape and wherein the first panel and the second panel are attached to the base panel along opposing edges of the base panel.

6. A cargo restraining system for vehicles as claimed in claim 4 wherein the base panel is non-rectangular and has at least three edges and wherein a first set of first and second panels are attached to the base panel along a first edge and a second set of first and second panels are attached to the base panel along a second edge, the first set and second set forming and angle with respect to each other and the base panel spanning the space between the first and second sets of panels.

7. A cargo restraining system for vehicles as claimed in claim 1 further comprising hook-type fasteners on the bottom of the base panel configured to grip and releasably hold the cargo restraining system on a carpeted surface.

8. A cargo restraining system for vehicles as claimed in claim 7 wherein the hook-type fasteners are formed on ribbons of material secured to the bottom of the base panel.

9. A cargo restraining system for vehicles as claimed in claim 7 wherein the hook-type fasteners are integrally formed with the base panel.

10. A cargo restraining system for vehicles as claimed in claim 1 further comprising a non-slip coating on the bottom of the base panel configured to resist sliding movement on a smooth surface.

11. A cargo restraining system for vehicles as claimed in claim 10 wherein the non-slip coating comprises a rubberized material, a rubber sheet, a polymer sheet, a rubberized foam, or a jell.

12. A cargo restraining system for vehicles as claimed in claim 1 wherein all of the hingeable attachments are selectively separable.

13. A cargo restraining system for vehicles as claimed in claim 12 wherein the hingeable attachments comprise snap-hinge attachments.

14. A cargo restraining system for vehicles as claimed in claim 1 further comprising selectively separable hinged attachment features along the side edges of the first panel such that the first panel on the cargo restraining system can be hingedly attached to the first panel of a like cargo restraining system to form a selectively configurable chain of cargo restraining systems.

* * * * *